United States Patent [19]

Mims

[11] Patent Number: 4,707,277

[45] Date of Patent: Nov. 17, 1987

[54] METHOD AND APPARATUS FOR REMOVING GRANULAR MATERIAL FROM AN AERATION BASIN

[75] Inventor: Ken Mims, Lake Monroe, Fla.

[73] Assignee: Uddo Mims International, Inc., Edgewater, Fla.

[21] Appl. No.: 714,034

[22] Filed: Mar. 20, 1985

[51] Int. Cl.⁴ .................. B01D 21/02; B01D 36/04
[52] U.S. Cl. .................... 210/805; 210/806; 210/241; 210/314; 210/416.1; 210/525
[58] Field of Search ............ 210/767, 780, 805, 241, 210/242.1, 194, 242.2, 374, 379, 382, 416.1, 416.2, 629, 416.3, 525, 526, DIG. 6, 805, 806, 170, 532.2; 137/264, 267; 209/12, 421, 351; 15/340; 280/5 D; 141/231

[56] References Cited

U.S. PATENT DOCUMENTS

| | | | |
|---|---|---|---|
| 2,010,538 | 8/1935 | Evans | 210/241 |
| 2,964,191 | 12/1960 | Arnold et al. | 210/241 |
| 3,842,461 | 10/1974 | Wurster | 15/340 |
| 4,040,864 | 8/1977 | Steeves | 210/242.1 |
| 4,046,689 | 9/1977 | Argyll | 210/241 |
| 4,134,174 | 1/1979 | Flynn et al. | 15/340 |
| 4,152,800 | 5/1979 | Nilsmar | 210/242.1 |
| 4,199,837 | 4/1980 | Fisco, Jr. | 15/340 |
| 4,227,893 | 10/1980 | Shaddock | 55/343 |
| 4,234,980 | 11/1980 | DiVito et al. | 15/340 |
| 4,306,967 | 12/1981 | Trautwein | 210/241 |
| 4,312,762 | 1/1982 | Blackburn et al. | 210/241 |
| 4,348,136 | 9/1982 | Donovan | 405/66 |
| 4,377,475 | 3/1983 | Wiedemann | 210/241 |
| 4,404,101 | 9/1983 | Koch et al. | 210/241 |
| 4,525,277 | 6/1985 | Poulin | 210/241 |

*Primary Examiner*—Richard V. Fisher
*Assistant Examiner*—Wanda L. Millard
*Attorney, Agent, or Firm*—Frijouf, Rust & Pyle

[57] ABSTRACT

An apparatus is disclosed for removing granular material from an aeration basin of a sewage plant. The apparatus includes a collector for collecting the granular material from the aeration basin. A first pump includes an input and an output port with the input port being in fluid tight communication with the collector for pumping and removing the granular material out of the aeration basin together with a portion of the sewage and waste water contained within the basin. A float is disposed on the surface of the sewage within the aeration basin, the float adjustably supporting the collector relative to the granular material to be removed. A buoyant conduit is connected to the output port of the first pump such that the buoyant conduit conducts the removed granular material, sewage, waste water and bio-mass from the float away from the aeration basin. A mobile reservoir includes an inlet and an outlet, the inlet being connected to the buoyant conduit such that the granular material, sewage and waste water removed from the aeration basin flows into the reservoir and the granular material settles towards the outlet. A separator having a first and a second opening is disposed with the first opening adjacent to and in fluid communication with the outlet of the reservoir. The separator extends angularly relative to the reservoir such that as the waste water and entrained granular material are conveyed away from the first opening of the separator towards the second opening, the waste water and bio-mass drains back towards the first opening and the granular material is separated from the waste water and is conveyed towards the second opening of the separator for discharge therefrom.

19 Claims, 3 Drawing Figures

METHOD AND APPARATUS FOR REMOVING GRANULAR MATERIAL FROM AN AERATION BASIN

BACKGROUND OF THE INVENTION

1. Field of the Invention

This invention relates to an apparatus for removing granular material from a sewage treatment plant. More specifically, this invention relates to an apparatus for removing sand from an aeration basin of a sewage treatment plant or the like.

2. Information Disclosure Statement

Municipal waste or the like is conveyed to a local sewage treatment plant in which the raw sewage is treated in various sedimentation processes after which the primary sludge is further treated in an aeration tank or basin for biological degradation thereof.

Although most sewage treatment plants incorporate bar screens and grit chambers for removing entrained granular material from the sewage to be treated, in practice a considerable amount of granular material reaches the aeration basin where such granular material accumulates.

The primary function of the aeration basin or aeration tank is to supply a steady stream of oxygen through the sewage contained in the aeration basin. Such oxygen enhances the ability of bacteria comprising the bio-mass within the aeration basin to feed upon and thereby degrade and decompose the sewage.

However, as the level of granular material accumulates within the aeration basin, the effective depth of the basin decreases. Therefore, the flow path of the air through the sewage aeration basin becomes shortened as the granular material accumulating within the aeration basin increases. This decrease in the distance travelled by the air through the sewage to be treated reduces the efficiency with which the sewage may be treated by such oxygen and this results in the requirement for more air for longer periods of time to compensate for the decrease in efficiency of the system as the granular material displaces the capacity of the aeration tank.

Another problem encountered with the accumulation of granular material within the aeration basin is that occasionally such accumulated solids will break loose and will travel downstream from the aeration basin and actually plug air defusers and the like thereby reducing the efficiency of the aeration process. Furthermore, if such granular material is carried completely over into an adjacent treatment tank, plugging of perculation ponds or drain fields may occur.

Above all, due to the accumulation of sand or similar granular material at the base of the aeration basin, the overall cost of operating the sewage treatment plant will increase because not only will the capacity of the aeration basin be reduced thereby reducing the overall effectiveness of the plant, but also because sewage plants are subject to peak flows at certain hours of the day. These flow surges are normally buffered by the correct sizing of the aeration chamber or basin. However, when the aeration basin includes an accumulation of sand and other solids, this buffering effect is impaired and solids will pass through the aeration tank without being properly treated with the oxygen stream. Needless to say, authorities responsible for enforcing environmental regulations impose heavy fines on sewage treatment plant operators falling below regulatory standards.

When sand or the like accumulates within the base of an aeration basin, not only are greater loading requirements placed upon aeration equipment and ancillary pumping gear, but the reduced efficiency of the aeration tank requires greater amounts of chlorination to meet required regulations and all these associated inefficiencies result in a greatly increased cost when operating the sewage plant.

In the past, when sand or the like has accumulated in the bottom of an aeration tank, two alternative recourses have been available to the sewage plant operator. Firstly, the sewage may be diverted if practical to an alternative treatment plant while the sand is removed from the aeration chamber manually or secondly, the sewage contained within the aeration tank must be removed therefrom into transportation tanks for removal to an alternative plant. In either case, it is necessary to shut down the sewage plant while such removal of granular material from the aeration tank is carried out. Additionally, the removal of sand or similar granular material from the bottom of an aeration basin is a time consuming and unpleasant occupation, and results in removal of the beneficial biomass as well.

A need has existed in the art for an apparatus for removing such build-up of sand, grit or granular material from the base of an aeration tank while maintaining the continued operation of the sewage plant.

The present invention provides an apparatus which is completely self contained and which enables an operating crew to remove granular material from an aeration basin while such aeration basin is still filled with sewage, without interrupting the normal operation of the sewage plant.

The present invention overcomes the aforementioned inadequacies of the prior art device by the provision of a collector disposed within the aeration basin for collecting the granular material from the base of the basin and for pumping the granular material to a mobile reservoir where the granular material settles to the bottom of the reservoir and is conveyed by a separator for separating the granular material from the waste material and for pumping waste water and sewage back from the reservoir to the aeration basin.

Another object of the present invention is the provision of apparatus for removing sand or the like from an aeration basin in which the collector is manually positioned relative to the sand and grit at the base of the aeration basin.

Another object of the present invention is the provision of an apparatus for removing sand or the like from an aeration basin in which the collector is remotely positioned relative to the sand to be removed.

Another object of the present invention is the provision of an apparatus for removing sand or the like from an aeration basin in which the apparatus includes a float for supporting the collector at a variable depth relative to the granular material to be removed.

Another object of the present invention is the provision of an apparatus for removing sand or the like from an aeration basin including a buoyant conduit extending from the float to and over the rim of the aeration basin for removing the accumulated sand from the base of the aeration tank away from the aeration basin.

Another object of the present invention is the provision of an apparatus for removing sand or the like from an aeration basin including a reservoir disposed on a turntable rotatably secured to a truck such that sand or the like to be removed from the base of the aeration basin is conveyed to an inlet of the reservoir where the sand rapidly settles to the lower outlet of the reservoir.

Another object of the present invention is the provision of an apparatus for removing sand or the like from an aeration basin including a reservoir having sloping opposed walls which slope from the inlet towards the outlet of the reservoir for dissipating the turbulent energy of the slurry entering the reservoir.

Another object of the present invention is the provision of an apparatus for removing granular material from an aeration basin which includes an Archimedean screw conveyor having a first and a second end, the first end being disposed adjacent the outlet of the reservoir such that granular material and waste water is conveyed upwardly along an angularly disposed conveyor to separate the waste water from the sand or the like to be removed.

Another object of the present invention is the provision of an apparatus for removing granular material from an aeration basin in which the granular material is discharged from the second end of the Archimedean screw conveyor and waste water flows downwardly along the conveyor towards the reservoir.

Another object of the present invention is the provision of an apparatus for removing granular material from an aeration basin which includes a weir extending into the chamber of the reservoir for permitting the level of the slurry within the chamber to be limited.

Another object of the present invention is the provision of an apparatus for removing granular material from an aeration basin of a sewage treatment plant in which an accumulator is disposed between a weir and a second pump for accumulating the slurry flowing through the weir and for returning such slurry to the aeration basin.

The foregoing has outlined some of the more pertinent objects of the present invention. These objects should be construed as being merely illustrative of the some of the more prominent features and applications of the invention. Many other beneficial results can be obtained by applying the disclosed invention in a different manner or modifying the invention within the scope of the disclosure. Particularly with regard to the use of the invention disclosed herein, this should not be construed as being limited to an apparatus for removing granular material from a sewage treatment plant, but should include apparatus for removing granular material from drains, holding tanks, treatment tanks or the like.

SUMMARY OF THE INVENTION

The apparatus and method of the present invention is defined by the appended claims with a specific embodiment shown in the attached drawings. For the purpose of summarizing the invention, the invention relates to an apparatus and method for removing granular material from an aeration basin of a sewage treatment plant. The apparatus includes a collector for collecting the granular material from the aeration basin. A first pump includes an input and an output port with the input port being in fluid tight communication with the collector for pumping and removing the granular material out of the aeration basin together with a portion of the sewage and waste water and bio-mass contained within the basin. A float floats on the surface of the sewage within the aeration basin for adjustably supporting the collector relative to the granular material to be removed. A buoyant conduit is disposed in fluid tight communication with the output port of the first pump such that the conduit conducts the removed granular material, sewage and waste water from the float away from the aeration basin. A mobile reservoir includes an inlet and an outlet with the inlet of the reservoir being connected to the conduit such that the granular material and waste water removed from the aeration basin flows into the reservoir and the granular material rapidly settles towards the outlet. A separator includes a first and a second opening with the first opening of the separator being disposed adjacent to and in fluid communication with the outlet of the reservoir. The separator extends angularly relative to the reservoir such that as the waste water and entrained granular material are conveyed away from the first opening of the separator towards the second opening, the waste water and bio-mass drains back towards the first opening and the granular material is separated from the waste water and is conveyed upwardly towards the second opening of the separator for discharge therefrom.

In a more specific embodiment of the present invention, the collector is a pipe having a proximal and a distal end with the proximal end being in fluid tight communication with the input port of the first pump and the distal end of the collector being movable relative to the granular material. A flexible control includes a first and a second rope each having a first and a second end with the first end of the ropes being secured to the float and the second ends of the ropes extending over the rim of the aeration basin such that the distal end of the collector relative to the granular material may be manually controlled by manipulating the respective ropes. The first pump is self-priming submersible pump driven by compressed air and the float also includes a height control having a first and a second end of which the first end of the height control is secured to the float and the second end of the height control is secured to the output port of the pump for permitting the selective control of the depth of the first pump within the aeration basin enabling the distal end of the collector to be positioned adjacent the granular material to be removed. Additionally, the float includes a pneumatic control which is secured to the float and a hose extending between the pneumatic control and the first pump for controlling the amount of granular material, sewage and waste water pumped by the first pump. In a preferred form of the present invention the float is of polystyrene foam and defines a bore through which the output port of the first pump slidably extends.

The buoyant conduit also includes a clamp which is clamped to the rim of the aeration basin such that the clamp defines a recess for receivably securing the conduit adjacent to the rim and for guiding the conduit from inside the basin over the rim of the basin. The conduit is buoyant such that the portion of the conduit extending between the output port of the first pump and the clamp floats on the surface of the sewage and waste water contained within the basin.

The mobile reservoir also includes a mobile turntable for permitting the reservoir to be rotated within a substantially horizontal plane such that the inlet of the reservoir is selectively positioned adjacent to the aeration basin. The mobile reservoir is pivotally disposed relative to the turntable such that the reservoir is selectively positioned angularly relative to the turntable. The reservoir defines a chamber having opposed sloping sidewalls which slope towards each other from the inlet to the outlet such that as the granular material, sewage and waste water enter the reservoir means through the inlet, turbulent energy of the granular material, sewage and waste water slurry is rapidly dissipated permitting the granular material to settle towards the outlet. The mobile reservoir further includes a weir which extends into the reservoir chamber for permitting the level of the slurry within the chamber to be limited. An accumulator is disposed between the weir and the second pump for accumulating the slurry without the granular material and for permitting the slurry to flow from the weir towards the accumulator and to be pumped by the second pump back to the aeration basin. The separator is an Archimedean screw conveyor which includes an elongate housing which extends angularly relative to the reservoir. An elongate axle is rotatably supported by and extends through and along the length of the housing. The axle includes a first and a second end with the first end of the axle being disposed adjacent to the outlet of the reservoir. A spiral conveyor is rigidly secured to the axle such that the spiral conveyor is rotatably disposed within the housing and extends between the first and the second opening of the separator such that when the axle and spiral conveyor rotate within the housing, granular material, sewage and waste water are conveyed upwardly along the housing from the first opening towards the second opening. The granular material continues upwardly until discharged from the second opening and the waste water is separated and flows downwardly carrying the bio-mass along the housing towards the first opening. A hydraulic motor is drivingly connected to the second end of the axle for controllably rotating the axle relative to the housing and the hydraulic motor is driven by a second pump.

The apparatus also includes a truck for rotatably supporting the separator. The truck including support means rigidly secured to the truck for releasably supporting the housing relative to the truck. An air accumulator supplies compressed air to the first pump for operating the first pump and an air compressor is secured to the truck for supplying compressed air to the air accumulator. A hydraulic cylinder is disposed between the housing and the turntable for controlling the elevation of the housing, and another hydraulic cylinder is disposed between the turntable and the truck for controlling the bearing of the housing and reservoir relative to the truck.

The present invention also includes a method of removing granular material from an aeration basin of a sewage treatment plant. The method includes the steps of positioning a collector within the aeration basin, connecting an input of a first pump to the collector, adjustably supporting the first pump relative to the granular material to be removed such that the collector is variably spaced relative to the granular material. A conduit is connected in fluid tight communication with an output port of the first pump and the conduit extends towards and is connected to a mobile reservoir such that the first pump operates to pump sewage waste water and entrained granular material through the collector, first pump and conduit towards the mobile reservoir. The granular material settles in the mobile reservoir towards the outlet of the mobile reservoir and a second pump pumps the sewage and waste water from the reservoir back to the aeration basin. Granular material is separated from the waste water by being conveyed angularly relative to the mobile reservoir such that as waste water and entrained granular material are conveyed away from a first opening of the separator towards a second opening thereof, the waste water drains back towards the first opening and the granular material is separated from the waste water and is discharged from the second opening of the separator.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception of the specific embodiment disclosed may be readily utilized as a basis for modifying or designing other apparatus for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention reference should be had to the accompanying drawings in which.

Similar reference characters refer to similar parts throughout the several views of the drawings.

DETAILED DESCRIPTION

Figure 1:
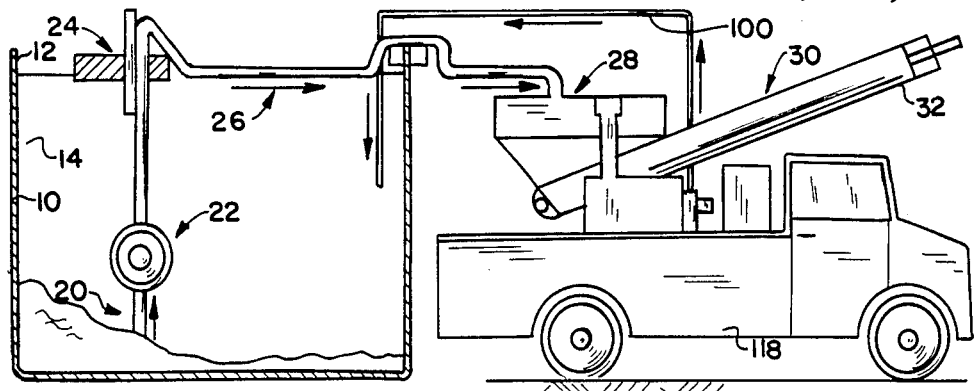
FIG. 1 is a diagrammatic representation partly in section of an apparatus for removing granular material from an aeration basin according to the present invention.

FIG. 1 is a diagrammatic representation partly in section of an apparatus for removing granular material from an aeration basin according to the present invention. The aeration basin 10 includes a circumferential rim 12 and is filled with sewage and waste water 14 to be treated. Granular material 16 such as sand, grit or other solid particulate material is shown to have accumulated adjacent the base 18 of the aeration basin 10. A collector generally designated 20 collects the granular material 16 from the base 18 of the aeration basin or tank 10. A first pump generally designated 22 pumps the removed granular material 16 together with sewage and waste water 14 upwardly towards a float generally designated 24. A flexible buoyant conduit generally designated 26 floats on the surface of the sewage 14 contained within the aeration tank 10. The buoyant conduit 26 conveys the removed granular material and sewage 16 and 14 to a mobile reservoir generally designated 28. The granular material 16 rapidly settles towards the bottom of the reservoir 28 and is conveyed by a separator generally designated 30 which conveys the granular material 16 together with waste water and sewage 14 angularly upwards towards a discharge opening 32.

Figure 2:
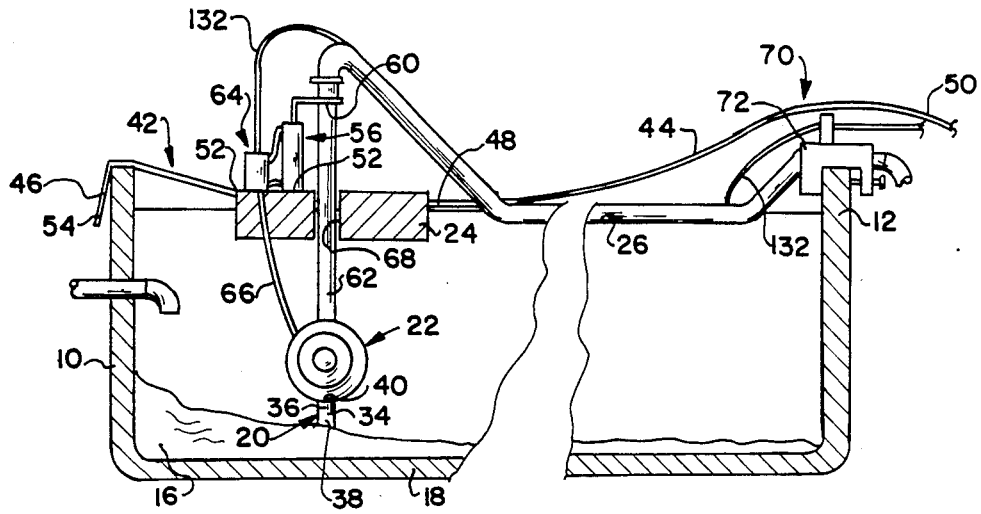
FIG. 2 is an enlarged sectional view of the aeration basin shown in FIG. 1 showing the collector, the first pump, the float and the buoyant conduit of the present invention.

More specifically, FIG. 2 is an enlarged sectional view of the aeration basin or tank 10 in which the collector means generally designated 20 is a pipe 34 having a proximal and a distal end 36 and 38 respectively. The proximal end 36 of the pipe 34 is in fluid tight communication with an input port 40 of the first pump generally designated 22. The distal end 38 of the collector 20 is movable relative to the granular material 16 disposed at the bottom or base 18 of the aeration basin 10. Flexible control means generally designated 42 include a first and a second rope 44 and 46 respectively. The first rope 44 includes a first and a second end 48 and 50 respectively. The second rope 46 also includes a first and second end 52 and 54 respectively. The first ends 48 and 52 of the ropes 44 and 46 are secured to the float 24 and the second ends 50 and 54 of the ropes 44 and 46 extend over opposite sides of the rim 12 of the aeration basin 10 such that the position of the distal end 38 of the collector 20 may be moved manually relative to the granular material 16 by manipulating the respective ends 50 and 54 of the ropes 44 and 46.

The first pump generally designated 22 is a self-priming submersible pump which is driven by compressed air.

The float generally designated 24 is preferably of polystyrene foam and includes a height control means generally designated 56. The height control means 56 includes a first and a second end 58 and 60 respectively with the first end 58 of the height control means 56 being secured to the float 24 and the second end 60 of the height control means 56 being secured to an output port 62 of the first pump 22 for permitting the selective control of the depth of the first pump 22 within the aeration basin 10 enabling the distal end 38 of the collector 20 to be positioned adjacent to the granular material 16 to be removed. The float 24 also includes pneumatic control means generally designated 64 secured to the float 24 and hose means designated 66 extending between the pneumatic control means 64 and the first pump 22 for controlling the amount of granular material 16, sewage and waste water 14 pumped by the first pump 22. The float 24 defines a bore 68 through which the output port 62 of the first pump 22 slidably extends.

The buoyant conduit means generally designated 26 also includes a clamp means generally designated 70 which is clamped to the rim 12 of the aeration basin 10. The clamp means 70 defines a recess 72 for receivably securing the conduit 26 adjacent to the rim 10 and for guiding the conduit 12 from inside the basin 10 over the rim 12 of the basin. The conduit means 26 is buoyant such that the portion of the conduit 26 which extends between the output port 62 of the first pump 22 and the clamp means 70 floats on the surface of the sewage and waste water 14 contained within the basin 10.

Figure 3:
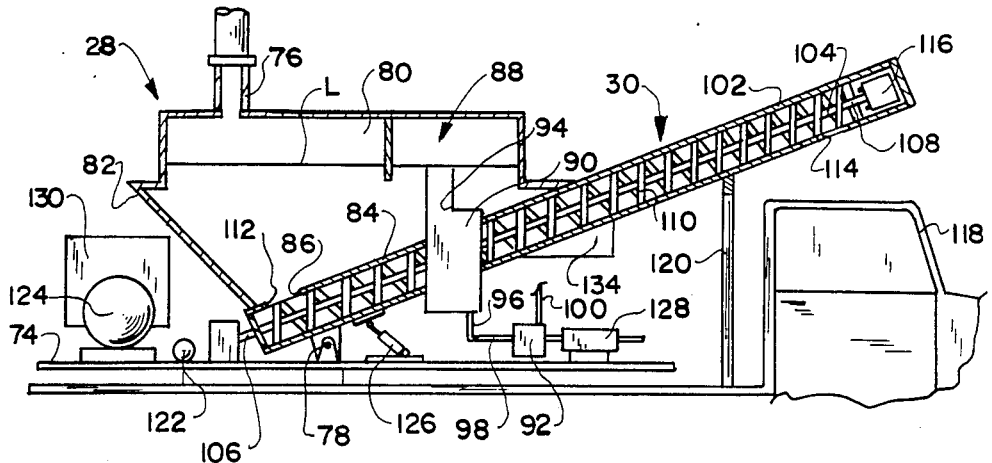
FIG. 3 is an enlarged fragmentary view partially in section of the mobile reservoir and the separator shown in FIG. 1.

The mobile reservoir means generally designated 28 is shown in more detail in FIG. 3 and includes a mobile turntable 74 for permitting the reservoir means 28 to be rotated within a substantially horizontal plane such that an inlet 76 of the reservoir means 28 is selectively positioned adjacent to the aeration basis 10 and the second opening 114 of separator 30 may be positioned so as to drop the drained granular material 16 at a desired location such as on the surface of the ground or into the bed of another truck. Pivotal means generally designated 78 are disposed between the turntable 74 and the reservoir means 28 such that the reservoir means 28 is selectively positioned angularly relative to the turntable 74. The reservoir means 28 defines a chamber 80 which includes opposed sloping side walls 82 and 84 respectively which slope towards each other from the inlet 76 to the outlet 86 of the reservoir means 28 such that as the granular material 16, sewage and waste water 14 enter the reservoir means 28 through the inlet 76, turbulent energy of the granular material, sewage and waste water slurry is rapidly dissipated permitting the granular material 16 to settle towards the outlet 86. Weir means generally designated 88 extend into the chamber 80 for permitting the level L of the slurry within the chamber 80 to be limited. An accumulator means 90 is disposed between the weir means 88 and a second pump means 92 for accumulating the slurry without the granular material 16. The accumulator means 90 includes an entry port and an exit port 94 and 96 respectively. The entry port 94 is connected to the weir means 88 for permitting the slurry from the weir means 88 to flow to the accumulator means 90. A first flexible pipe 98 extends from the exit port 96 of the accumulator means 90 to the second pump means 92 and a second flexible pipe 100 extends from the second pump means 92 to the aeration basin 10 for enabling slurry to be pumped from the accumulator means 90 back to the aeration basin 10.

As shown in FIG. 3, the separator means generally designated 30 is an Archimedean screw conveyor. The separator means 30 includes an elongate housing 102 which extends angularly relative to the reservoir means 28. An elongate axle 104 is rotatably supported by and extends through and along the length of the housing 102. The axle 104 includes a first and a second end 106 and 108 respectively with the first end 106 of the axle 104 being disposed adjacent to the outlet 86 of the reservoir means 28. A spiral conveyor means 110 is rigidly secured to the axle 104 such that the spiral conveyor means 110 is disposed within the housing 102. The conveyor means 110 extends between a first and the second openings 112 and 114 respectively of the separator means 30 such that when the axle 104 and the spiral conveyor means 110 rotate within the housing 102, granular material 16, sewage and waste water 14 are conveyed upwardly along the housing 102 from the first opening 112 towards the second opening 114. The granular material 16 continues upwardly until discharged from the second opening 114 and the waste water separated from the granular material 16 flows downwardly along the housing 102 towards the first opening 112. The separator means 30 also includes a hydraulic motor 116 which is drivingly connected to the second end 108 of the axle 104. The hydraulic motor 116 is driven by a hydraulic pump (not shown) which is powered by first motor 124.

As shown in FIGS. 1 and 3, a truck 118 rotatably supports the separator means 30 such that in use of the apparatus, the separator means 30 is rotated relative to the truck 118 so that the second opening 114 of the separator means 30 is disposed away from the truck 118 thereby permitting the removed granular material 16 to be loaded into a dump truck or the like (not shown). FIG. 3 shows support means 120 rigidly secured to the truck 118 for releasably supporting the housing 102 relative to the truck 118. An air accumulator 122 supplies compressed air to the first pump means 22 for operating the first pump means 22. The accumulator 122 is connected to an air compressor 130 secured to the truck 118 for suppling compressed air to the air accumulator 122.

In operation of the apparatus, the clamp 70 is secured to the rim 12 of the aeration basin 10 with the buoyant conduit 26 secured within the recess 72 of the clamp 70. The float 24 and pump means 22 are placed inside the aeration basin 10 with the float 24 floating on the surface of the sewage 14. The height control means 56 is operated to bring the distal end 38 of the collector means 20 into proximity with the granular material 16 to be removed. By manipulating the ends 50 and 54 of the ropes 44 and 46, the distal end 38 of the collector 20 is positioned manually in order to bring the distal end 38 of the collector 20 close to the sand to be removed and the first pump 22 pumps the sand and sewage out of the aeration basin 10 by means of the buyoant conduit 26. The removed sand and sewage are conveyed to the inlet 76 of the reservoir 28 where the sand and sewage are discharged into the chamber 80. Due to the sloping configuration of the mobile reservoir means 28, turbulent energy of the slurry is rapidly dissipated and the sand quickly settles towards the first opening 112 of the Archimedean screw conveyor 110. The sewage and entrained sand is conveyed upwardly by the rotating Archimedean screw conveyor at an angle of 18° to the horizontal as this has been found to be the optimum angle for separating the sand and other granular material entrained within the waste water. As the granular material passes upwardly to be discharged from the second opening 114 of the housing 102 waste water and bio-mass drains back down the housing 102 towards the first opening 112.

As the level L of the sewage or bio-mass within the chamber 80 rises, a point is reached in which the level L of the slurry is the same as that of the weir 88 such that the addition of more slurry to the chamber 80 from the inlet 76 results in waste water and sewage tipping over the weir 88 into the accumulator 90 from which the waste water and sewage are pumped by the second pump means 92 back to the aeration basin 10 as shown in FIG. 1.

In order to decrease the water content of sand or granular material discharged from the second opening 114, the hydraulic cylinder 126 is actuated to increase the angular disposition of the housing 102 relative to the turntable 74.

The second pump means 92 is driven by a second motor 128 such that the second pump means 92 pumps sewage and waste water and biomass back to the aeration basin 10.

A first motor 124 drives first air compressor 130 which supplies compressed air to the air accumulator 122. The air accumulator 122 supplies compressed air to the first pump 22 and pneumatic control means 64 by means of a hose means 132 shown in FIG. 2.

A control box 134 shown in FIG. 3 includes a plurality of control levers (not shown) for controlling selectively the operation of a hydraulic cylinder 126, the first pump 22 and the height control means 56 by means of suitable pneumatic and hydraulic control circuitry well known to those skilled in the art. The control box 134 also includes manual control levers for controlling the second pump means 92 and the hydraulic motor 116 for rotating the screw conveyor 110. Control means are also provided (not shown) for hydraulically controlling rotation of the turntable 74 relative to the truck 118. First motor 124 drives both the air compressor 130 and hydraulic pump means (not shown) for operating the various hydraulic components.

In the preferred embodiment of the present invention, the housing 102 is of a square transverse configuration thereby allowing ample room for the accommodation of the hydraulic conduits therein for powering the hydraulic motor 116. The second motor 128 in the preferred form of the present invention is rated at 5 horsepower and the hydraulic motor 116 is capable of producing 25–35 horsepower motor for rotating the Archimedean screw conveyor 110. The second pump means 92 is of the type having a maximum flow capacity of 280 gallons per minute. The screw conveyor is 14 inches (35.56 cm) in diameter with the individual flights of the conveyor being spaced 7 inches (17.78 cm) apart; the length of the housing is 15 feet (4.57 m) such that sand or granular material discharged from the second opening 114 has a 20% moisture content after draining when the Archimedean screw conveyor rotates at approximately 12 revolutions per minute. As will be appreciated from the foregoing, the time taken for the removed sand to travel from the first opening 112, to the second opening 114 is approximately 2–3 minutes.

The first motor 124 is a diesel motor which drives an air compressor for supplying compressed air at approximately 150 lbs. per square inch to the accumulator 122. The diesel engine 124 is rated at approximately 53 horsepower in the preferred embodiment. The first pump means 22 operates with an air pressure between 60–90 pounds per square inch with a delivery of approximately 40 cubic feet per minute and is capable of pumping at least 100 gallons per minute of slurry comprising sewage and entrained sand.

The apparatus of the present invention enables removal of sand from sewage treatment plants without the need for draining the bio-mass from the aeration tank. Until the present invention, there has been no method of removing the sand deposits without shutting down the sewage treatment plant. The present invention enables the sewage treatment plant to remain in operation with the contents of the aeration tank being recirculated through the reservoir back to the aeration basin during removal of the sand from the circulatory system thereby avoiding the costly and inconvenient shut-down procedures that have previously been required.

The present disclosure includes that contained in the appended claims as well as that of the foregoing description. Although this invention has been described in its preferred from with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing granular material from an aeration basin of a sewage treatment plant containing granular material, bio-mass, sewage and waste water, comprising:

a collector means for collecting the granular material from the aeration basin;

first pump means having an input and an output port, said input port being in fluid tight communication with said collector means for pumping and removing the granular material out of the aeration basin together with a portion of the bio-mass, sewage and waste water contained within the basin;

conduit means in fluid tight communication with said output port of said first pump means, said conduit means conducting the removed granular material, sewage and waste water from said first pump means away from the aeration basin;

mobile reservoir means having an inlet and an outlet, said inlet of said reservoir means being connected to said conduit means such that the granular material, bio-mass, sewage, and waste water removed from the aeration basin flows into said reservoir means and the granular material settles towards said outlet;

said reservoir means defining a chamber having opposed sloping sidewalls which slope towards each other from said inlet to said outlet such that as the granular material, sewage and waste water enter said reservoir means through said inlet, turbulent energy of the granular material, sewage and waste water is rapidly dissipated permitting the granular material to settle towards said outlet;

separation means having a first and a second opening, said first opening of said separation means being disposed adjacent to and in fluid communication with said outlet of said reservoir means, said separator means extending angularly relative to said reservoir means such that as the waste water and granular material are conveyed away from said first opening of said separation means towards said second opening of said separation means, the waste water drains back toward said first opening of said separation means and the granular material is separated from the waste water and is conveyed towards said second opening of said separation means for discharge therefrom; and a second pump means in fluid communication with said reservoir means for pumping the bio-mass, sewage and waste water from said reservoir means back to the aeration basin.

2. Apparatus for removing granular material from an aeration basin as set forth in claim 1, further includes a float means floating on the surface of the sewage contained within the aeration basin for adjustably supporting said collector means relative to the granular material to be removed.

3. Apparatus for removing granular material from an aeration basin as set forth in claim 2, wherein said float means further includes:

height control means having a first and a second end, said first end of said height control means being secured to said float, said second end of said height control means being secured to said output port of said first pump means for permitting the selective control of the depth of said first pump means within the aeration basin enabling the distal end of said collector means to be positioned adjacent to the granular material to be removed.

4. Apparatus for removing granular material from an aeration basin as set forth in claim 3, wherein said float mean further includes:

pneumatic control means secured to said float means;
hose means extending between said pneumatic control means and said first pump means for controlling the amount of granular material, sewage and waste water pumped by said first pump means.

5. Apparatus for removing granular material from an aeration basin as set forth in claim 4, wherein said float means is of polystyrene foam, said float means defining a bore through which said outlet port of said first pump slidably extends.

6. An apparatus for removing granular material from an aeration basin as set forth in claim 1, wherein said collector means is a pipe having a proximal and a distal end, said proximal end being in fluid tight communication with said input port of said first pump means, said distal end of said collector means being movable relative to the granular material disposed at the bottom of the aeration basin.

7. Apparatus for removing granular material from an aeration basin as set forth in claim 6, wherein said collector means further includes:

flexible control means having a first and a second end, said first end of said control means being secured to a float means, said second end of said control means extending away from the aeration basin such that the position of said distal end of said collector means relative to the granular material is manually controlled by manipulating said control means.

8. Apparatus for removing granular material from an aeration basin as set forth in claim 1, wherein said mobile reservoir means further includes:

a mobile turntable for permitting said reservoir means to be rotated within a substantially horizontal plane such that said inlet of said reservoir means is selectively positioned relative to the aeration basin; and pivotal means disposed between said turntable and said reservoir means such that said reservoir means is selectively positioned angularly relative to said turntable.

9. Apparatus for removing granular material from an aeration basin as set forth in claim 8, wherein said mobile reservoir means further includes:

weir means extending into said chamber for permitting the level of the slurry within said chamber to be limited;

said accumulator means disposed between said weir means and said second pump means for accumulating the bio-mass, sewage and waste water without the granular material, said accumulator means having an entry port and an exit port, said entry port being connected to said weir means for permitting the slurry to flow from said weir means to said accumulator means;

a first flexible pipe extending between said exit port of said accumulator means and said second pump means; and a second flexible pipe extending from said second pump means to the aeration basin for enabling slurry to be pumped from said accumulator means back to the aeration basin.

10. Apparatus for removing granular material from an aeration basin as set forth in claim 1, wherein said first pump means is a self-priming submersible pump driven by compressed air.

11. Apparatus for removing granular material from an aeration basin as set forth in claim 1, wherein said separation means is an Archimedean screw conveyor.

12. Apparatus for removing granular material from an aeration basin as set forth in claim 1, wherein the aeration basin further includes an upper rim which defines an approximate upper limit of the holding capacity of the aeration basin and wherein said conduit means is buoyant and further includes:

clamp means clamped to the rim of the aeration basin, said clamp means defining a recess for receivably securing said conduit means adjacent to the rim and for guiding said conduit means from inside the basin over the rim of the basin; and said conduit means being buoyant such that the portion of said conduit means extending between said output port of said first pump means to said clamp means floats on the surface of the bio-mass, sewage and waste water contained within the basin.

13. An apparatus for removing granular material from an aeration basin of a sewage treatment plant containing granular material, bio-mass, sewage and waste water, comprising:
- a collector means for collecting the granular material from the aeration basin;
- first pump means having an input and an output port, said input port being in fluid tight communication with said collector means for pumping and removing the granular material out of the aeration basin together with a portion of the bio-mass, sewage and waste water contained within the basin;
- conduit means in fluid tight communication with said output port of said first pump means, said conduit means conducting the removed granular material, sewage and waste water from said first pump means away from the aeration basin;
- mobile reservoir means having an inlet and an outlet, said inlet of said reservoir means being connected to said conduit means such that the granular material, bio-mass, sewage, and waste water removed from the aeration basin flows into said reservoir means and the granular material settles towards said outlet;
- separation means having a first and a second opening, said first opening of said separation means being disposed adjacent to and in fluid communication with said outlet of said reservoir means, said separator means extending angularly relative to said reservoir means such that as the waste water and granular material are conveyed away from said first opening of said separation means towards said second opening of said separation means, the waste water drains back toward said first opening of said separation means and the granular material is separated from the waste water and is conveyed towards said second opening of said separation means for discharge therefrom; and
- said separation means is an Archimedean screw conveyor; and
- a second pump means in fluid communication with said reservoir means for pumping the bio-mass, sewage and waste water from said accumulator means back to the aeration basin.

14. Apparatus for removing granular material from an aeration basin as set forth in claim 13, wherein said separation means further includes:
- an elongate housing extending angularly relative to said reservoir means;
- an elongate axle rotatably supported by and extending through and long the length of said housing, said axle having a first and a second end, said first end of said axle being disposed adjacent to said outlet of said reservoir means; and
- spiral conveyor means rigidly secured to said axle, said spiral conveyor means being disposed within said housing and extending between said first and second opening of said separator means such that when said axle and spiral conveyor means rotate within said housing, granular material, sewage and waste water are conveyed upwardly along said housing from said first opening towards said second opening, and the granular material continues upwardly until discharged from said second opening and the waste water separated from the granular material flows downwardly along said housing towards said first opening.

15. Apparatus for removing a granular material from an aeration basin as set forth in claim 14, wherein said separation means further includes:
- a hydraulic motor drivingly connected to said second end of said axle for rotating said spiral conveyer means.

16. Apparatus for removing granular material from an aeration basin as set forth in claim 14, wherein said apparatus further includes:
- a truck for rotatably supporting said separator means;
- support means rigidly secured to said truck for releasably supporting said housing relative to said truck;
- an air accumulator for supplying compressed air to said first pump means for operating said first pump means; and
- an air compressor secured to said truck for supplying compressed air to said air accumulator.

17. An apparatus for removing granular material from an aeration basin of a sewage treatment plant containing bio-mass, sewage, waste water and granular material, said apparatus comprising:
- a collector means for collecting the granular material from the aeration basin;
- first pump means having an input and an output port, said input port being in fluid tight communication with said collector means for pumping and removing the granular material out of the aeration basin together with a portion of the sewage and waste water contained within the basin;
- buoyant conduit means in fluid tight communication with said output port of said first pump means, said conduit means conducting the removed granular material, sewage and waste water from said first pump means away from the aeration basin;
- mobile reservoir means having an inlet and an outlet, said inlet of said reservoir means being connected to said conduit means such that the granular material, sewage, and waste water removed from the aeration basin flows into said reservoir means and the granular material settles towards said outlet;
- second pump means for pumping the sewage and waste water from said reservoir means back to the aeration basin; and
- an Archimedean screw separation conveyor having a first and a second opening, said first opening of said conveyor being disposed adjacent to and in fluid communication with said outlet of said reservoir means, said separation conveyor extending angularly relative to said reservoir means such that as the waste water and entrained granular material are conveyed away from said first opening of said separation conveyor towards said second opening of said separation conveyor, the waste water drains back towards said first opening and the granular material is separated from the waste water and is conveyed toward said second opening of said separation conveyor for discharge therefrom.

18. An apparatus for removing granular material from an aeration basin of a sewage treatment plant containing bio-mass, sewage, waste water and granular material, said apparatus comprising:
- a collector means for collecting the granular material from the aeration basin;
- first pump means having an input and an output port, said input port being in fluid tight communication with said collector means for pumping and removing the granular material out of the aeration basin together with a portion of the sewage and waste water contained within the basin;

buoyant conduit means in fluid tight communication with said output port of said first pump means, said conduit means conducting the removed granular material, sewage and waste water from said first pump means away from the aeration basin;

mobile reservoir means having an inlet and an outlet, said inlet of said reservoir means being connected to said conduit means such that the granular material, sewage, and waste water removed from the aeration basin flows into said reservoir means and the granular material settles towards said outlet;

second pump means for pumping the sewage and waste water from said reservoir means back to the aeration basin; and an Archimedean screw conveyor for separating the granular material from the sewage and waste water, said Archimedean screw conveyor further including:
- an elongate housing defining a first and second opening, said housing extending angularly relative to said reservoir means, said housing beind disposed at an angle of substantially 18 degrees to the horizontal;
- an elongate axle rotatably supported by and extending through and along the length of said housing, said axle having a first and a second end, said first end of said axle being disposed adjacent to said outlet of said reservoir means; and
- spiral conveyor means rigidly secured to said axle, said spiral conveyor means being disposed within said housing and extending between said first and second opening of said housing such that when said axle and spiral conveyor means rotate within said housing, granular material, sewage and waste water are conveyed upwardly along said housing from said first opening towards said second opening, the granular material continuing upwardly until discharge from said second opening and the waste water separating and flowing downwardly along said housing towards said first opening.

19. A method of removing granular material from an aeration basin of a sewage plant containing waste water, sewage and granular material and returning the waste water and sewage to the aeration basin, comprising the steps of:

positioning a collector for collecting the granular material from the aeration basin;

connecting an input of a first pump in fluid tight communication with the collector;

connecting a conduit in fluid tight communication with an output port of the first pump;

connecting the conduit to a mobile reservoir disposed outside the aeration basin;

pumping the sewage and waste water together with removed granular material such that the granular material flows from the aeration basin through the collector, first pump and conduit towards the mobile reservoir;

settling the granular material within the mobile reservoir such that the granular material settles towards an outlet of the mobile reservoir;

separating the granular material from the sewage and waste water such that the separated granular material is conveyed angularly relative to the reservoir thereby permitting sewage, waste water and entrained granular material to be conveyed away from the first opening of the separator towards a second opening of the separator, so that the waste water drains back towards the first opening and the granular material is separated from the waste water and conveyed towards the second opening for discharge therefrom; and pumping the sewage and waste water from the reservoir back to the aeration basin.

* * * * *